United States Patent [19]
Ishitsuka et al.

[11] Patent Number: 5,747,823
[45] Date of Patent: May 5, 1998

[54] TWO-DIMENSIONAL CODE MARK DETECTING METHOD AND APPARATUS THEREFOR

[75] Inventors: Tomoaki Ishitsuka, Kyoto-fu; Toshio Oshima, Osaka; Hirofumi Noguchi; Mitsunari Kano, both of Seto, all of Japan

[73] Assignees: Hitachi Maxell, Ltd., Osaka-fu; Hitachi, Ltd., Tokyo-to, both of Japan

[21] Appl. No.: 694,259

[22] Filed: Aug. 8, 1996

[30] Foreign Application Priority Data

Aug. 8, 1995 [JP] Japan .................................. 7-224725

[51] Int. Cl.⁶ .................................................. G01N 21/86
[52] U.S. Cl. ...................... 250/559.44; 250/566; 235/494
[58] Field of Search ............................. 250/559.44, 556, 250/235, 566, 559.4; 235/462, 472, 494; 382/313

[56] References Cited

U.S. PATENT DOCUMENTS 3,790,756  2/1974  Graves et al. ........................ 235/462
5,430,284  7/1995  Numazaki ............................. 235/462
5,506,394  4/1996  Plesko .................................. 235/462

Primary Examiner—Que Le
Attorney, Agent, or Firm—Birch, Stewart, Kolasch & Birch, LLP

[57] ABSTRACT

A method of and an apparatus for detecting information from a code marking formed on a carrier by illuminating the code marking with illuminating light and detecting an emission from an illuminated position on which the illuminating light is projected. The code marking is a two-dimensional code marking bearing the information in first and second directions perpendicular to each other, and an illuminated area at the illuminated position is of a fine ribbon-like shape having a length greater than a maximum possible width of the code marking in the first direction and smaller than a minimum possible information width in the second direction. Illumination of the code marking is carried out by moving in a direction parallel to the second direction while traversing in the first direction.

6 Claims, 5 Drawing Sheets

TWO-DIMENSIONAL CODE MARK DETECTING METHOD AND APPARATUS THEREFOR

BACKGROUND OF THE INVENTION

1. (Field of the Invention)

The present invention generally relates to a method of and an apparatus for detecting information from a code marking such as, for example, a bar code on a background surface by illuminating the code marking and detecting light reflected or fluorescent radiation from the code marking. More particularly, the present invention relates to the method of and the apparatus for detecting information from a two-dimensional code marking bearing the information in two directions different from each other.

2. (Description of the Prior Art)

To encode information on various merchandises on sale, it has long been well known in the art to use a bar code marking in combination with a bar code reader. The bar code marking generally consists of a plurality of black, light-absorbing bars of an equal length, but of two different widths, printed or otherwise formed in any suitable way on a background so as to define a white, light-reflecting bar or space of a large or small width between each neighboring black bars. In this type of code marking, information carried by a particular bar code is represented by a combination of differing widths of the black bars and differing widths of the white bars, wherein the bold black bar and the fine black bar represent binary digits of "1" and "0", respectively.

As is well known to those skilled in the art, information can be read out by scanning a beam from a light source across the bar code, then detecting light reflected or fluorescent radiation from the black bars and white bars, and converting the reflected light or fluorescent radiation into electric signals which are subsequently processed and decoded. In scanning the code mark of the kind referred to above, a spot of light may be sufficient and whether or not the entire length of each bar is illuminated is irrelevant. This type of code marking may be referred to as a one-dimensional code marking in the sense that information encoded therein is developed only in one direction in which the bars are developed.

As the number of pieces of information to be presented for a given type or kind of articles increases, the standard bar code marking has become difficult to accommodate the increased pieces of information and, for this reason, an alternative bar code marking has now come to be used. This alternative bar code marking is known as a two-dimensional code marking in which the length of each bar or the position of each bar on the background is utilized to represent a piece of information in combination with the width of the bar.

Since according to the known two-dimensional code marking, information carried by the marking is set not only in the lengthwise direction of the code marking, but also in the widthwise direction thereof, a code reading method is suggested which comprises projecting light so as to illuminate across the code marking and shifting the illuminated position in the lengthwise direction, restricting or gating the emission or light reflected from the illuminated position into a ribbon of light by the use of a lens and a slit, and performing a sequential data analysis with respect to ribbon-shaped images of bar codes to thereby decode the information carried by the code marking.

In this known code reading method, the resolution with which the information can be coded, or the depth of reading, depends on characteristics of the lens and the slit both included in a photo-detecting system. If a high resolution is desired, the depth of reading tends to become shallow. On the other hand, if an attempt is made to handle a large number of code markings in a short time, articles such as, for example, postal cards or envelopes must be transported successively at a high speed. It is known that as the speed of transport of the articles increases, thrashing inevitably occurs in a direction perpendicular to the direction of transport of the articles and the reading accuracy will be considerably lowered with increase of the degree of thrashing.

Based on the finding of a series of studies done in an attempt to resolve the problems discussed above the inventors of the present invention have found that while in the prior art the bar code images have been restricted or gated in the photo-detector system, the problems could be solved at a stroke when the restriction or gating of the bar code images are carried out in a light illuminating system.

SUMMARY OF THE INVENTION

The present invention is therefore based on the above discussed finding and is intended to provide an improved method of and an improved apparatus for detecting information from the two-dimensional code marking, wherein the illuminating light used to illuminate the code marking is shaped into a ribbon of light of a length greater than the maximum possible width of the code marking and smaller than the minimum possible information width (the minimum possible width of the code area) as measured in a direction parallel to the direction of movement of the code marking.

The use of the ribbon of light of the particular size makes it possible to allow the resolution of the code marking and the depth of reading to depend solely on the structure of the light illuminating system and, hence, makes it possible to simplify the photo-detecting system.

Another important object of the present invention is to provide an improved method of and an improved apparatus for detecting the two-dimensional code marking wherein the ribbon of illuminating light is projected along an optical axis defined on a plane perpendicular to the direction of movement of the code marking to thereby secure a stable and precise depth of reading even though a carrier on which the code marking is applied undergoes a thrashing motion.

To this end, the present invention provides a method of and an apparatus for detecting information from a code marking formed on a carrier by illuminating the code marking with illuminating light and detecting an emission from an illuminated position on which the illuminating light is projected. The code marking is a two-dimensional code marking bearing the information in first and second directions perpendicular to each other, and an illuminated area at the illuminated position is of a fine ribbon-like shape having a length greater than a maximum possible width of the code marking in the first direction and smaller than a minimum possible information width in the second direction. Illumination of the code marking is carried out by moving in a direction parallel to the second direction while traversing in the first direction.

Preferably, the illuminating light has an optical axis lying on a plane perpendicular to the second direction of the code marking.

Also, the illuminating means may comprise at least one light source and a cylindrical lens for concentrating the illuminating light from the light source in a widthwise direction thereof. Preferably, a lens element may be disposed between the light source and the cylindrical lens for converting the illuminating light from the light source into parallel light.

BRIEF DESCRIPTION OF THE DRAWINGS

This and other objects and features of the present invention will become clear from the following description taken in conjunction with preferred embodiments thereof with reference to the accompanying drawings, in which like parts are designated by like reference numerals and in which.

DETAILED DESCRIPTION OF THE EMBODIMENTS

Figure 1:
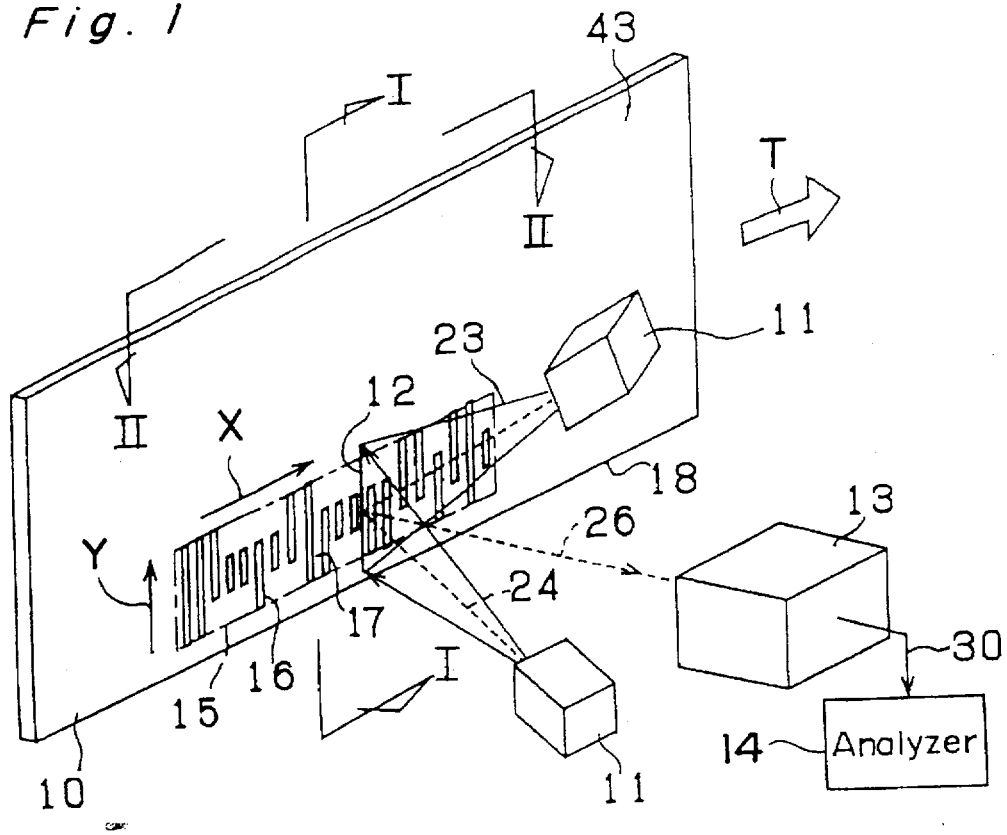
FIG. 1 is a schematic perspective view, showing the principle of code reading according to the present invention.

Before the description of the present invention proceeds, it is to be noted that the term "depth of reading" hereinabove and hereinafter used is intended to means the distance the illuminated position can be moved while the images of the marking remain acceptably sharp without the position of the photo-detector being adjusted.

The principle of the present invention will first be described with reference to FIGS. 1 and 2. According to the present invention, a marking 15 formed on, or otherwise affixed in any suitable manner to a carrier 10 is illuminated with illuminating light 23, and an emission 26 (either the illuminated light 23 reflected or a fluorescent light emitted) from an illuminated position 12 is detected for decoding information represented by the marking 15. The marking 15 shown therein is of a two-dimensional type in which pieces of information are developed in its first or widthwise direction Y and a second or lengthwise direction X perpendicular to the first or widthwise direction Y.

In this system, the present invention is featured in that an illuminated area at the illuminated position 12 on which the illuminating light 23 is projected is so chosen as to have a length greater than the maximum possible width of the marking 15 in the first direction of the marking 15 and smaller than the minimum possible information width in the second direction of the marking 15 and as to be relatively moved in a direction, shown by the arrow T, parallel to the second direction while traversing in the first direction. It is to be noted that the ribbon-shaped illuminating light 23a preferably has an optical axis 24 lying on a plane perpendicular to the second direction of the marking 15.

An apparatus capable of performing the above described detecting method includes an illuminating unit 11 for illuminating the marking 15 on the carrier 10 with the illuminating light 23, a photo-detecting unit 13 capable of detecting the emission 26 from the illuminated position 12 on the marking 15, and an analyzing unit 14 capable of encoding information represented by the marking 15 in reference to the detected emission.

Figure 2:
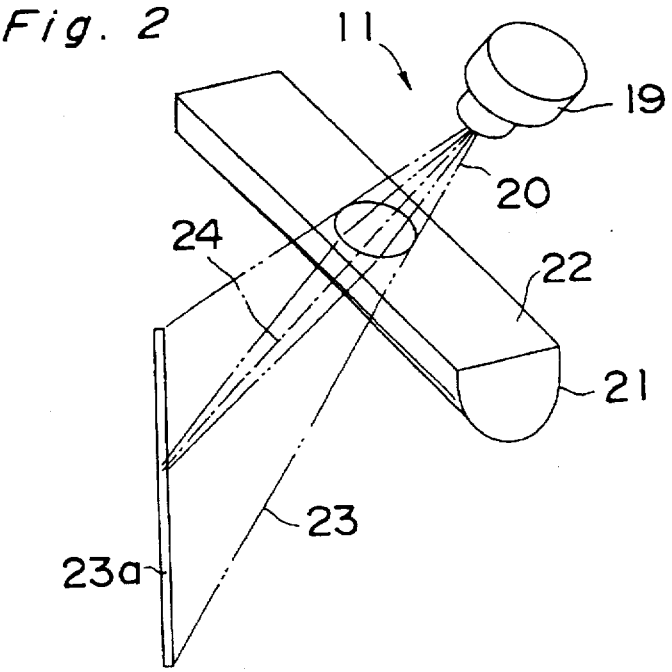
FIG. 2 is a schematic perspective view, showing an illuminating light source according to a first preferred embodiment of the present invention.
Figure 6:
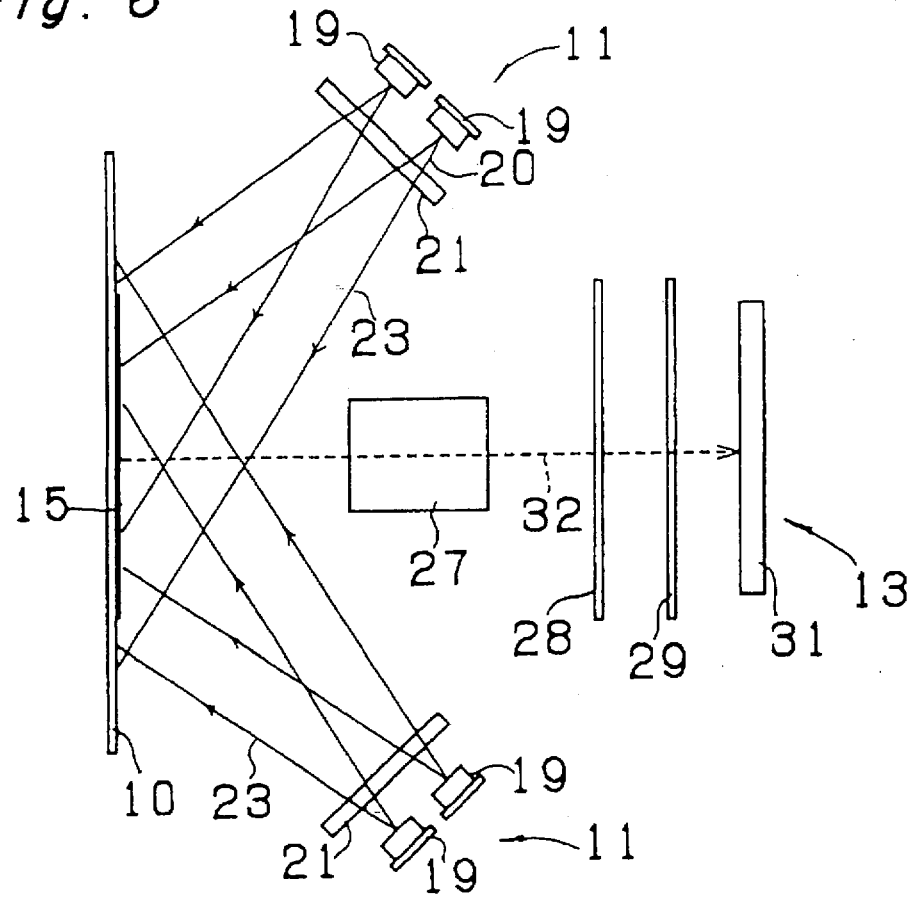
FIGS. 6 and 7 are views similar to FIGS. 4 and 5, respectively, showing another preferred embodiment of the present invention.
Figure 7:
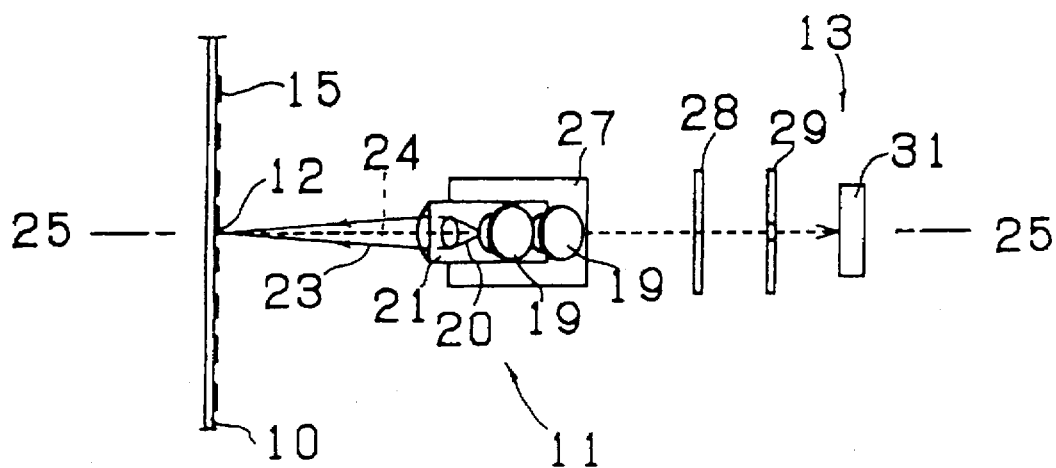
Figure 8:
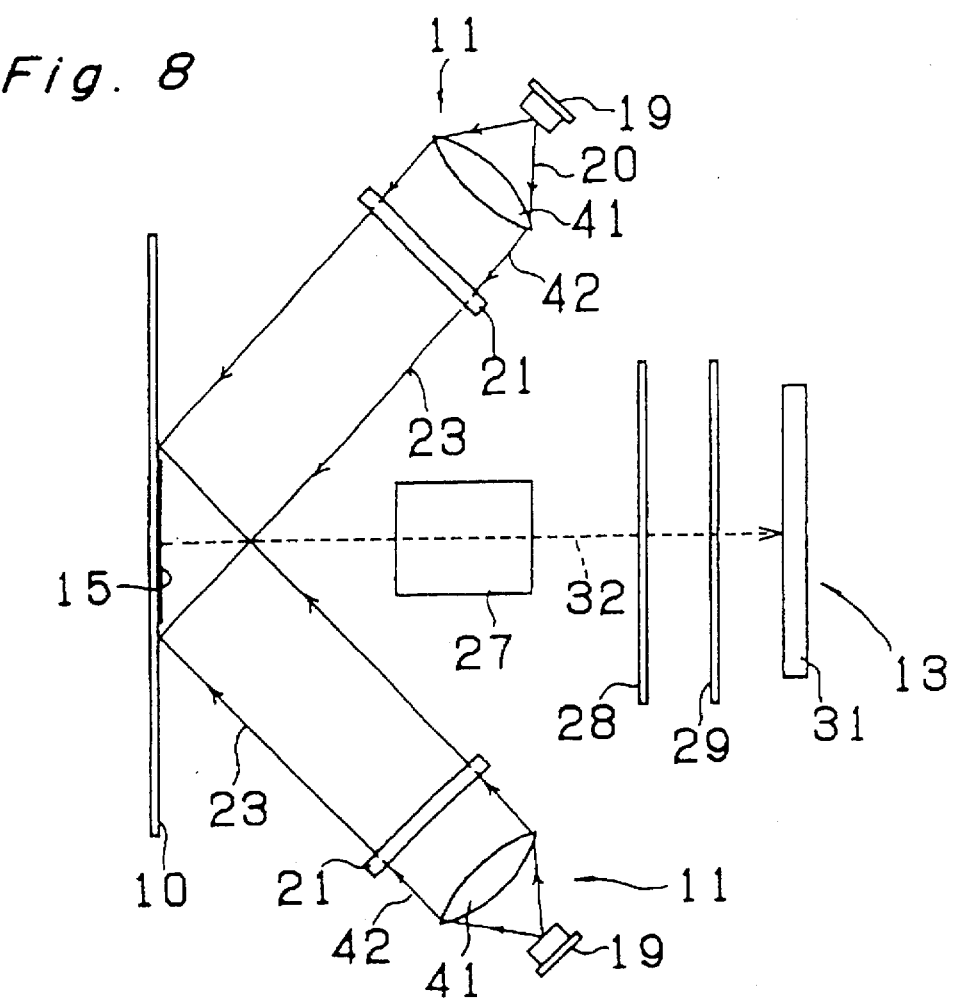
FIGS. 8 and 9 are views similar to FIGS. 4 and 5, respectively, showing a further preferred embodiment of the present invention.
Figure 9:
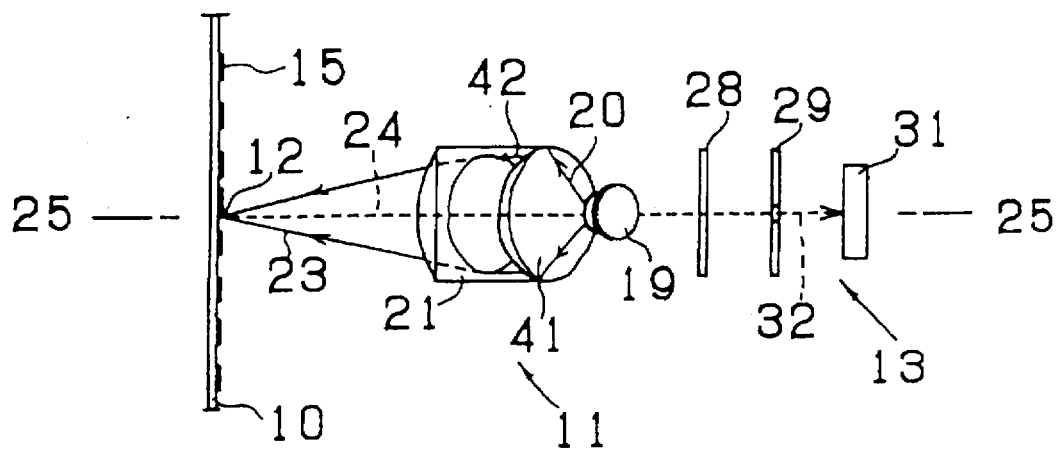

The illuminating unit 11 referred to above may comprise a single spot light source 19 as shown in FIG. 2 or a plurality of, for example, two, spot light sources 19 as shown in FIGS. 6 and 7, in combination with a cylindrical lens 21 for concentrating or collecting rays of light 20 from the light source or sources 19 in a widthwise direction thereof. Also, as shown in FIGS. 8 and 9, a lens 41 for concentrating or collecting the rays of light 20 from the light source or sources 19 may be additionally employed in the illuminating unit 11.

Thus, the ribbon of illuminating light 23a projected from the illuminating unit 11 in the widthwise direction of the marking 15 shifts in the lengthwise direction of the marking 15 as the carrier 10 of the marking 15 moves. Simultaneously therewith, the photo-detecting unit 13 detects the ribbon-shaped emission 26 from the illuminated position 12 and converts it into an electric signal 30 corresponding to the quantity of light incident thereupon, which signal 30 is sequentially analyzed by the analyzing unit 14 to encode the code presented in the marking 15 to thereby determine the entire shape of the marking 15.

Figure 5:
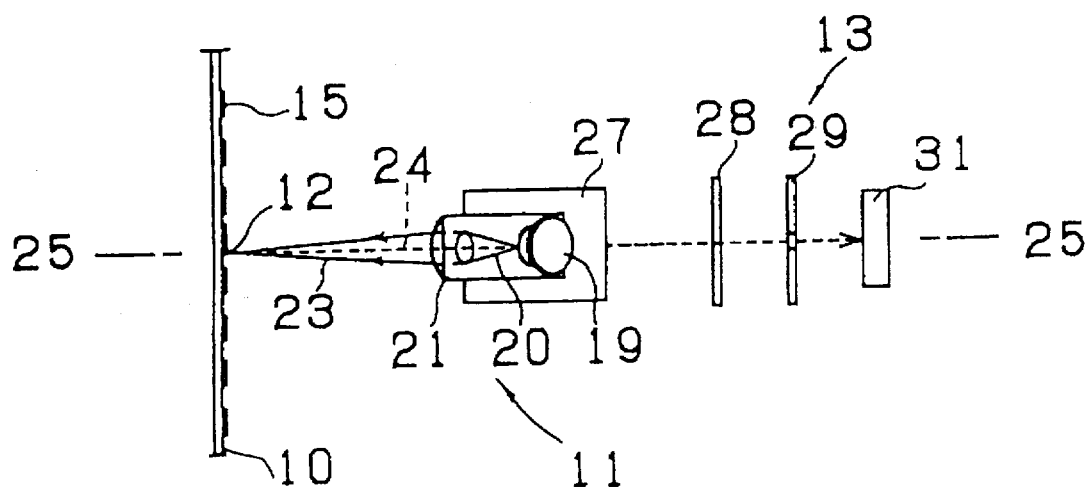
FIG. 5 is a diagram, as viewed along the line shown by II—II in FIG. 1, showing the manner in which the illuminating light from the illuminating light source is projected.

As discussed above, by restricting or gating the illuminating light 23 as shown in FIG. 5, the gating of the light in the photo-detecting system can be minimized to a minimum necessary value and, consequently, the depth of reading can be increased. Also, by positioning the optical axis 24 for the illuminating light 23 so as to lie on the plane perpendicular to the lengthwise direction of the marking, the position on which the illuminating light is projected does not change even though the carrier 10 of the marking 15 undergo the thrashing motion and, therefore, the photo-detecting system can accomplish a stable marking detecting operation.

Specifically, in the practice of the present invention, the illuminating light 23a projected from the illuminating unit 11 towards the marking 15 is of a shape having a length greater than the maximum possible width of the marking 15 but smaller than the minimum possible information width in the direction of movement of the marking 15. Accordingly, it is possible to determine the resolution of the marking 15 and the depth of reading depending on the structure of the illuminating unit 11 and, therefore, the photo-detecting unit 13 can be simplified. Also, since the optical axis 24 along which the illuminating unit 11 aims at the marking lies on a plane 25 perpendicular to the second direction of the marking 15, it is possible to secure a stable and precise reading accuracy even though the carrier 10 of the marking 15 undergoes the thrashing motion during the movement thereof.

Specific embodiments of the present invention will now be described, in which the carrier of the marking is shown in the form of a generally rectangular postal card with the apparatus designed to detect a bar code marking printed on a surface of the postal card. It is, however, to be noted that the marking may be of any desired shape such as formed by inking or painting one or some of grid boxes in a grid-patterned area. Also, the carrier on which the marking is affixed or otherwise printed may not be limited to the postal matter, but may be of any kind such as, for example, a pre-paid card or any other goods.

Furthermore, while the apparatus is shown to detect a fluorescent emission induced from the marking upon exposure to infrared rays of light, the present invention can be equally applied to the type which relies on reflection of light from the marking in decoding the information.

As schematically shown in FIG. 1, the marking detecting apparatus comprises a transport unit (not shown) for transporting postal cards, representing respective carriers 10, successively in a direction shown by the arrow T, the illuminating unit 11 for projecting the illuminating light 23 onto the position where the marking is formed on each postal card 10, the photo-detecting unit 13 for detecting the emission 26 from the illuminated position 12 where the illuminating light 23 is projected and converting the detected emission into the electric signal 30, and the analyzing unit 14 for analyzing the electric signal 30 to determine the information represented by the marking 15.

The marking 15 present on a surface 43 of the postal card 10 is in contrast to the standard bar code in which a plurality of bars 16 are juxtaposed in a direction parallel to the second or lengthwise direction thereof and in which information is represented by a combination of differing widths of bars 16 and differing widths of spaces 17 each between the neighboring bars 16. Rather, the marking 15 present on the surface 43 of the postal card 10 is of a two-dimensional design in which, while the bars are juxtaposed as are the case with the standard bar code, the information is represented by the length of each bar 16 and the position where each bar 16 is formed. Also, the marking 10 employed in the present invention are formed by printing on the postal card so that the bars 16 forming the marking 15 can lie perpendicular to and be spaced an equal distance from a lower edge 18 of the carrier 10. The postal card carrying this two-dimensional marking 15 is so transported in a direction parallel to the lengthwise direction of the marking 15 in which the plural bars 16 are juxtaposed while allowing the marking 15 on the postal card 10 to move past the same position.

The transport unit (now shown) is so designed and so configured that while the postal card 10 is transported in the transport direction T at a predetermined high speed with at least the lower ledge 18 of the postal card 10 and a rear surface thereof being guided by guide elements (not shown), the marking 15 on the postal card 10 can be scanned by the illuminating light 23 from the illuminating unit 11 continuously in the lengthwise direction while being traversed thereby in the widthwise direction.

As shown in FIG. 2, the illuminating unit 11 comprises the light source 19 and the lens 21 for collecting the rays of light 20 from the light source 19. The light source 19 may be a laser diode for emitting a laser beam and is so disposed and so positioned that the rays of light 20 emitted from the light source 19 in the form of a spot or point light can have a required length of illumination at the illuminated position 12.

On the other hand, the lens 21 is in the form of a cylindrical lens having a substantially semicircular cross-sectional shape having a convex surface and a flat rear surface 22 opposite to the convex surface. The rays of light 20 incident upon the flat rear surface 22 of the cylindrical lens 21 are dispersed in a lengthwise direction thereof, but restricted or limited in a widthwise direction thereof as they pass through the cylindrical lens 21, thereby being converted into the ribbon-shaped illuminating light 23a.

The ribbon-shaped illuminating light 23a has a width smaller than the smallest width of some of the bars 16 forming the marking 15, or the width of the space 17 between each neighboring bars 16 forming the marking 16, and a length slightly greater than the maximum possible width of the marking 15. The illuminated position 12 is so defined and so positioned that, when the postal card 10 is transported by the transport unit, the ribbon-shaped illuminating light 23a can scan the marking 15 in the lengthwise direction, as the postal card 10 is moved relative to the incoming ribbon-shaped illuminating light 23a, while encompassing the width of the marking 15.

Figure 4:
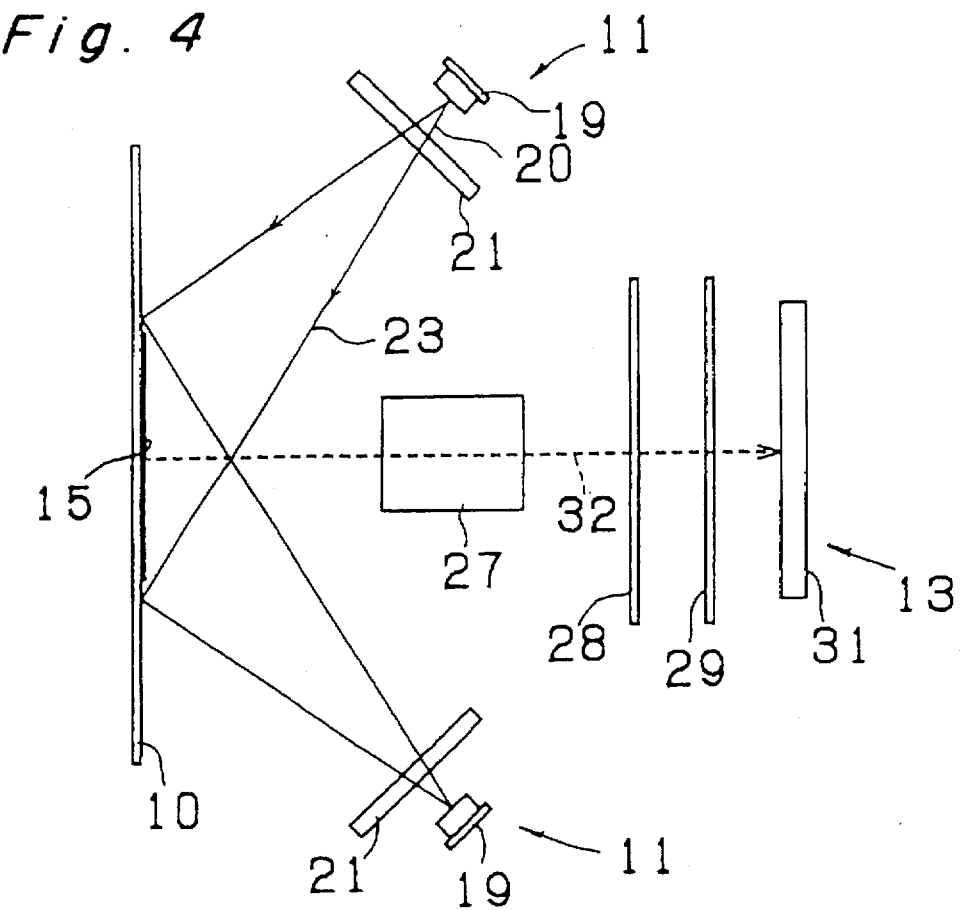
FIG. 4 is a diagram, as viewed along the line shown by I—I in FIG. 1, showing the manner in which the illuminating light from the illuminating light source is projected.

As shown in FIGS. 1, 4 and 5, the illuminating unit 11 of the structure shown in FIG. 2 is employed for each of upper and lower positions of the marking 15, and the light sources 19 and the lenses 21 of the respective illuminating units 11 are so disposed and so positioned that the optical axes 24 for the illuminating light 23 each extending from the center of the light source of the respective illuminating unit 11 to the center of the illuminated position 12 can lie on the same plane 25—25 perpendicular to the direction of movement of the marking 15. By this design, even though the marking 15 displaces so as to approach or move away from the illuminating units 11, no displacement of the illuminated position 12 relative to the direction of movement of the marking 15 take place.

Figure 3:
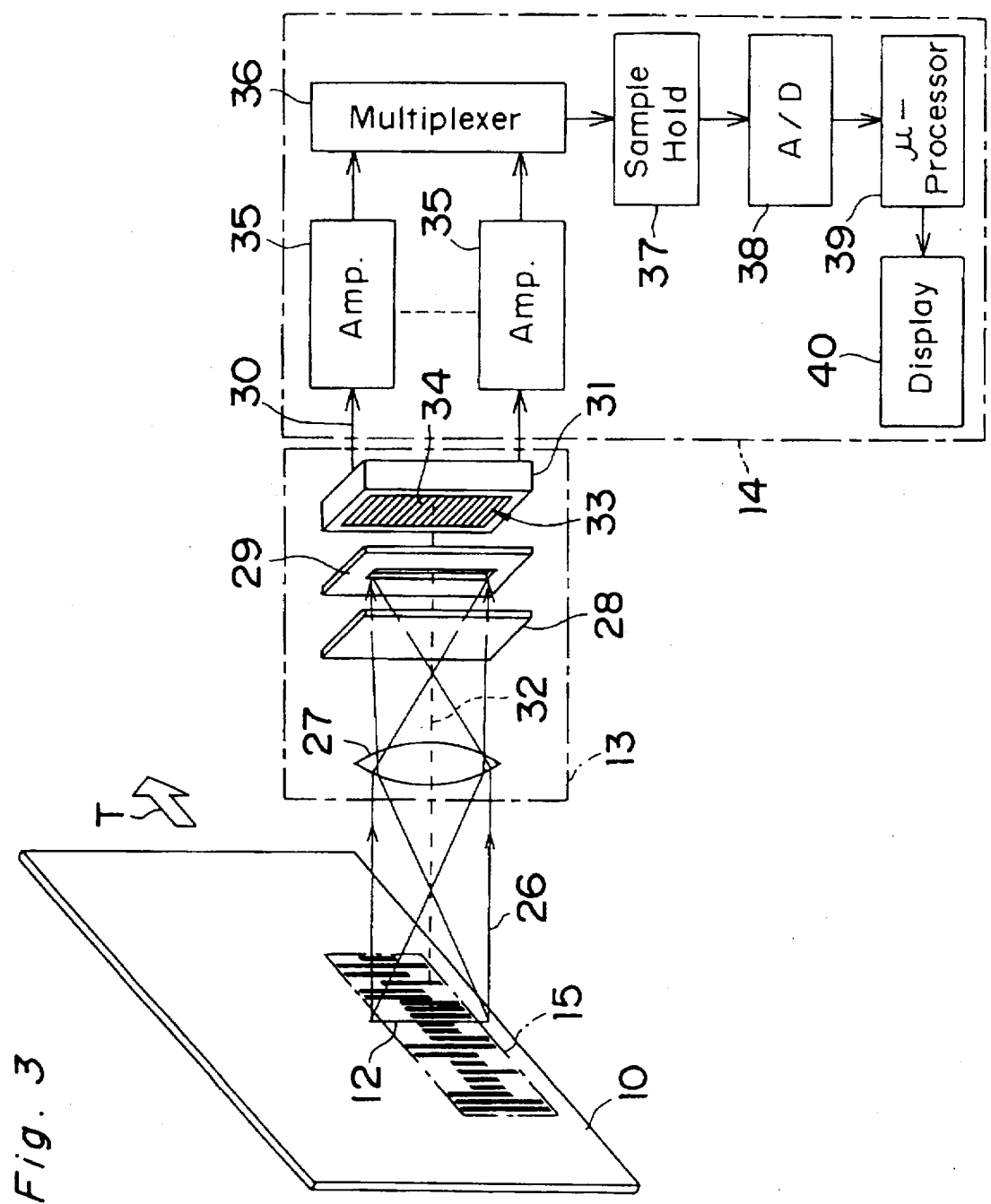
FIG. 3 is an explanatory diagram showing the details of each of the illuminating light source and a marking analyzing circuitry both shown in FIG. 1.

On the other hand, as best shown in FIG. 3, the photo-detecting unit 13 is operable to detect the fluorescent emission 26 from the illuminated position 12 at which the illuminated light 23 is projected onto the postal card 10. This photo-detecting unit 13 comprises an image forming lens 27 for collecting the fluorescent emission 26, an optical filter 28 for selectively blocking light of wavelengths other than that of the fluorescent emission and passing therethrough only the wavelength of the fluorescent emission 26, a slit 29 for gating the incoming fluorescent emission 26 into a ribbon-like configuration, and an array of photoelectric converting elements 31 for converting difference in quantity of light at various points of the ribbon-shaped fluorescent image into an electric signal 30.

The image forming lens 27 has its optical axis 32 and is so positioned as to allow the optical axis 32 to lie perpendicular to the illuminated position 12, upon which the illuminating light 23 from the illuminating unit 11 impinges, and as to permit an image to be formed on an incident surface 33 of the array of the photoelectric converting elements 31. The array of the photoelectric converting elements 31 is of a design wherein photoelectric converting elements 34 such as photodiodes, the number of which corresponds to the resolution in the widthwise direction of the marking 15 (76 elements so far illustrated), are arranged in a vertical direction in closely adjoining relation with each other and, therefore, when the fluorescent image emitted from the illuminated position 12 is formed by the utilization of the image forming lens 27, electric signals 30 of respective voltage values corresponding to the quantity of incident light from the associated photoelectric converting elements 34 can be outputted so that the shape of the marking 15 can be one-dimensionally cut out in a ribbon-like shape and be then fed to the analyzing unit 14 as a set of the electric signals 30 corresponding to respective positions of the 76 photoelectric converting elements.

The analyzing unit 14 is operable to sequentially read the ribbon-shaped images, so supplied in the manner described above, on a time-series basis with movement of the marking 15 so that the entire image of the marking 15 can be detected by a combination of sub-scans in the widthwise direction of the marking 15 and main scans in the lengthwise direction of the marking 15. In other words, the plural electric signals 30 supplied from the array of the photoelectric converting elements 34 are, after having been amplified by respective amplifiers 35, supplied in parallel to a multiplexer 36.

The multiplexer 36 is of a type capable of extracting the parallel inputted electric signals 30 on a time series basis one at a time and the extracted electric signals 30 are, after having subsequently held in a sample-hold circuit 37 temporarily, converted sequentially by an analog-to-digital converter (A/D) 38 from the analog signals into corresponding digital signals to thereby complete a single-line scanning. By repeating this signal processing at intervals of sufficiently short predetermined times, the shape of the marking 15 can be specified as a set of a plurality of line information.

Those digital signals are in turn supplied to a microprocessor 39 which performs a standard data processing in a manner known to those skilled in the art to thereby recognize the information represented in and by the shape of the marking 15, a result of which recognition is subsequently displayed by an indicator 40 such as, for example, a display, or is subsequently subjected to a required control process.

FIGS. 6 and 7 illustrates a second embodiment of the illuminating units 11. In the foregoing embodiment, the single light source 19 has been employed for each of the illuminating units 11. In this embodiment of FIGS. 6 and 7, two illuminating units 11 each comprising a pair of the light sources 19 are employed. The light sources 19 for each of the illuminating units 11 are so positioned and so juxtaposed that the illuminating light 23 emerging from the respective light sources 19 can substantially exactly overlap with each other at the illuminated position 12 in the widthwise direction thereof. By allowing the ribbons of illuminating light emerging from those light sources 19 to overlap with each other at the illuminated position 12, the intensity of illumination can advantageously be increased. Also, by displacing the position of the illuminating light 23 from one of the light sources 19 relative to that from the other of the light sources 19 in the widthwise direction thereof, the length of the ribbon of the illuminating light can be increased without decreasing the intensity of illumination.

FIGS. 8 and 9 illustrates a third embodiment of the illuminating units 11, in which a condenser lens 41 is disposed between the light source 19 of each illuminating unit 11 and the cylindrical lens 21 for converting the rays of light emerging from the respective light source 19 into parallel light 42 which is subsequently projected through the associated cylindrical lens 21 onto the marking 15 at the illuminated position 12. While light dispersed in the widthwise direction of the illuminating light 23 as it pass through the cylindrical lens 21 such as occurring in the prior art can be converged by the condenser lens 41 so that the rays of light 20 emitted by the respective light source 19 can be efficiently converted into the illuminating light 23. In addition, the length of the ribbon of the illuminating light 23 is regulated by the condenser lens 41 and, therefore, the illuminating light 23 representing the ribbon shape of a desired length can be obtained.

Although the present invention has been described in connection with the preferred embodiments thereof with reference to the accompanying drawings, it is to be noted that various changes and modifications are apparent to those skilled in the art. For example, in the foregoing embodiments the use of the pair of the illuminating unit 11 has been shown, the single illuminating unit 11 may be employed in the practice of the present invention provided that a sufficient amount of light can be obtained, or three or more illuminating units 11 may be employed provided that the amount of light is short of the requirement. In addition, in place of the laser diode, a light emitting diode or any other light source may be employed for the light source or light sources 19. The illuminating light 23 may be of any suitable kind having any suitable wavelength, for example, within the visible region or within the ultraviolet region, depending on the purpose of use and/or the environment in which the system is employed.

Also, the photo-detecting unit 13 may not be always limited to that shown and described, but may have any suitable circuit structure. In particular, if a fine width sufficient to secure a necessary resolution can be obtained in the illuminating light 23 within a tolerance in which the marking 15 is moved towards or away from the illuminating units 11 can be maintained at the illuminated position 12, the use of the slit 29 may be dispensed with. Rather, the slit 29 is used only for auxiliary purpose of compensating for variation in illuminating width of the illuminating light 23 and is therefore not necessarily essential in the practice of the present invention.

Furthermore, in describing the apparatus of the present invention, the marking has been shown and described as moved relative to the marking detecting apparatus. However, the concept of the present invention is equally applicable to the system in which the detecting apparatus is moved relative to the marking then fixed in position or the system in which the both are fixed in position, but the illuminated position is moved.

Such changes and modifications are to be understood as included within the scope of the present invention as defined by the appended claims, unless they depart therefrom.

What is claimed is:

1. A method of detecting information from a code marking formed on a carrier by illuminating the code marking with illuminating light and detecting an emission from an illuminated position on which the illuminated light is projected, wherein said code marking is a two-dimensional code marking bearing the information in a first and a second direction that are perpendicular to each other, the method comprising the steps of:

forming an illuminated area at the illuminated position in a fine ribbon-like shape having a length that is greater than a maximum possible width of the code marking in the first direction and smaller than a minimum possible information width in the second direction; and illuminating the code marking by moving the code marking or the illuminated area in a direction parallel to the second direction while traversing the code marking with the illuminated area in the first direction.

2. The method as claimed in claim 1, wherein said illuminating light has an optical axis lying on a plane perpendicular to the second direction of the code marking.

3. An apparatus for detecting information from a code marking formed on a carrier, which comprises:

illuminating means for illuminating the code marking on the carrier;

photo-detecting means for detecting an emission from an illuminated position where illuminating light from the illuminating means is projected; and an analyze for detecting the information from the code marking in reference to the emission detected by the photo-detecting means;

wherein said code marking is a two-dimensional code marking bearing the information in first and second directions perpendicular to each other;

wherein an illuminated area at the illuminated position is formed into a fine ribbon-like shape having a length greater than a maximum possible width of the code marking in the first direction and smaller than a minimum possible information width in the second direction; and wherein illumination of the code marking is carried out by moving in a direction parallel to the second direction while traversing in the first direction.

4. The apparatus as claimed in claim 3, wherein said illuminating light has an optical axis lying on a plane perpendicular to the second direction of the code marking.

5. The apparatus as claimed in claim 4, wherein the illuminating means comprises at least one light source and a cylindrical lens for concentrating the illuminating light from the light source in a widthwise direction thereof.

6. The apparatus as claimed in claim 5, further comprising a lens element disposed between the light source and the cylindrical lens for converting the illuminating light from the light source into parallel light.

* * * * *